United States Patent [19]
Nakamura et al.

[11] Patent Number: 5,145,021
[45] Date of Patent: Sep. 8, 1992

[54] POWER STEERING APPARATUS

[75] Inventors: Yasuhiro Nakamura; Akira Chikamori, both of Osaka, Japan

[73] Assignee: Koyo Seiko Co., Ltd., Osaka, Japan

[21] Appl. No.: 561,539

[22] Filed: Aug. 1, 1990

[30] Foreign Application Priority Data

Aug. 4, 1989 [JP] Japan .................. 1-203240
Nov. 17, 1989 [JP] Japan .............. 1-134220[U]
Mar. 26, 1990 [JP] Japan ................... 2-77986

[51] Int. Cl.⁵ .............................................. B62D 5/04
[52] U.S. Cl. .................... 180/79.1; 74/606 R; 475/149
[58] Field of Search ................. 180/79.1, 142; 74/606 R; 475/149, 154

[56] References Cited

U.S. PATENT DOCUMENTS

| 2,551,742 | 5/1951 | Huebner et al. | 180/79.1 |
| 3,083,590 | 4/1963 | Mueller | 475/154 |
| 4,587,861 | 5/1986 | Morishita | 475/149 |
| 4,593,780 | 6/1986 | Saito | 180/79.1 |
| 4,671,125 | 6/1987 | Yabunaka | 475/149 |
| 4,799,566 | 1/1989 | Shimizu | 180/79.1 |
| 4,800,766 | 1/1989 | Isozumi et al. | 475/149 |
| 4,865,145 | 9/1989 | Ijiri et al. | 180/79.1 |
| 4,890,683 | 1/1990 | Matsuda et al. | 180/79.1 |
| 4,961,474 | 10/1990 | Daido et al. | 180/79.1 |

FOREIGN PATENT DOCUMENTS

171663 8/1986 Japan .

Primary Examiner—Charles A. Marmor
Assistant Examiner—A. M. Boehler
Attorney, Agent, or Firm—Townsend and Townsend

[57] ABSTRACT

A power steering apparatus provided with an electromagnetic clutch disposed between an output shaft of a steering assisting motor and a transmission shaft connected to a steering mechanism, an intermediate transmission shaft supported between the output shaft and transmission shaft and supporting an armature part of the electromagnetic clutch, and a biasing member to bias the intermediate transmission shaft in the axial direction. The intermediate transmission shaft is pressed to the side of the output shaft by the biasing member and a fixed initial gap is formed between a friction plate fixed to the output shaft and another friction plate fixed to the armature part. In addition, this power steering apparatus is provided with a shielding member between a reduction unit and the electromagnetic clutch for shielding these two from each other. Lubricant scattering from the reduction unit is prevented from reaching the electromagnetic clutch owing to the presence of the shielding member.

20 Claims, 5 Drawing Sheets

POWER STEERING APPARATUS

BACKGROUND OF THE INVENTION

1. Field of the Invention

This invention relates to a power steering apparatus having an electric motor as a source to generate a steering assisting power and, in particular, to a power steering apparatus provided with an electromagnetic clutch in a power transmission system exetending from the electric motor to a steering mechanism.

2. Description of Related Art

Recently, a power steering apparatus employing an electric motor as a source to generate a steering assisting power has been in practical use. The apparatus is intended to reduce a burden of labor required for operating a steering wheel by assisting the performance of a steering mechanism with the rotative power of a steering assisting electric motor disposed in the steering mechanism and driven on the basis of results of detecting steering torque.

The power steering apparatus, as compared with a hydraulic power steering apparatus employing a hydraulic actuator as a source to generate a steering assisting power, has an advantage that appropriate characteristics corresponding to vehicle speed, frequency of steering operation, and running condition can be exhibited because the characteristics can be easily changed with the rotation control of the electric motor. However, this apparatus is followed by such a problem as difficulty in obtaining an electric motor of small size which is capable of generating sufficient rotative power for assisting steering. Further problem is that inertia of the rotating parts of the electric motor influences the steering operation. Hence, such means as disposing an appropriate speed reduction unit between an output shaft of the electric motor and a transmission shaft connected to the steering mechanism has hitherto been employed so as to solve the abovesaid first problem by the power increasing action of the speed reduction unit. For solving the second problem, provided is a structure that an electromagnetic clutch is arranged between the output shaft of the electric motor and the transmission shaft connected to the steering mechanism so that both shafts may be engaged with each other, only when required, by the action of the electromagnetic clutch.

The electromagnetic clutch is provided with friction plates respectively rotating in accordance with the output shaft and transmission shaft, a driving coil fixedly disposed on the back of the friction plate on the side of the output shaft, and an armature part disposed on the back of the friction plate on the side of the transmission shaft. On the other hand, the action of the armature part following excitation of the driving coil presses both friction plates to each other and also engages both shafts with each other, and, on the other hand, the action of the armature part following de-excitation of the driving coil releases mutual pressing of friction plates and disengages both shafts from each other. Until today, there has been such a structure that an output shaft on which a friction plate on one side and a retainer therefor are coaxially fitted and a transmission shaft on which an armature part formed integral with a friction plate on the other side is coaxially fitted are separately supported on the same shaft, and respective supported ends of both shafts are disposed oppositely to each other at an appropriate distance. As the reduction unit, a planetary gear reduction unit or planetary roller reduction unit, which can coaxially be composed of the output shaft of the motor and transmission shaft connected to the steering mechanism and is easily reduced in size, is used and disposed on one side of the electromagnetic clutch side by side.

In the conventional steering apparatus thus composed, an extremely high precision of working is required for supported parts of both shafts as well as a fitting part between both shafts and the retainer or armature part in order to obtain a fixed initial gap between both friction plates of the electromagnetic clutch. Both friction plates supported by the cantilevered armature part and retainer can't be prevented from tilting and alike suffer such a problem as requiring a complicated gap adjusting operation and a long period of time for assembling to obtain a uniform initial gap between them. Further, even if care is fully taken for working and assembling, complete prevention of insufficiency in setting the initial gap is substantially impossible. If the initial gap is too large, slip occurs between both friction plates when engaging each other and power transmission is hampered whereas, if the gap is too small, offensive abnormal noise is generated by slide contact of both friction plates when disengaged, thereby insufficiency in performance being caused.

When a reduction unit as described above is provided between the output shaft of the motor and transmission shaft extending to the steering mechanism, lubricant (grease) applied to rotating parts scatters to the side of the electromagnetic clutch and sticks to its friction plates upon operation of the reduction unit and the engaging action is unfavorably hampered.

SUMMARY OF THE INVENTION

An object of this invention is to provide a power steering apparatus capable of surely forming a fixed initial gap between both friction plates of the electromagnetic clutch.

Another object of this invention is to provide a power steering apparatus capable of eliminating troublesomeness in working and assembling the electromagnetic clutch.

Further object of this invention is to provide a power steering apparatus capable of removing insufficient action of the electromagnetic clutch resulting from sticking of lubricant thereto while preventing scatter of lubricant from the reduction unit to the electromagnetic clutch.

A power steering apparatus according to this invention is disposed between an output shaft of a steering assisting motor and a transmission shaft extending to a steering mechanism and provided with an electromagnetic clutch to connect and disconnect both shafts to and from each other with the action of an armature part thereof, and intermediate transmission shaft supported by the output shaft and transmission shaft and supporting the armature part, and biasing means to bias the intermediate transmission shaft in the axial direction toward a supporting position on the side of the output shaft. The intermediate transmission shaft prevents the armature part from tilting and is pressed to the side of the output shaft by biasing means so as to restrict the axial displacement occurred between the output shaft and the intermediate transmission shaft as well as the armature part supported thereby, whereby an initial gap roughly uniform in the circumferential direction is formed as fixed between both friction plates respectively fixed to the output shaft and armature part.

The power steering apparatus of this invention is also provided with a reduction unit composed on the intermediate transmission shaft and a shielding member disposed between the reduction unit and electromagnetic clutch for shielding the latter from the former. Lubricant scattering from the reduction unit is surely prevented from reaching the electromagnetic clutch by the shielding member so that insufficient performance of the electromagnetic clutch resulting from sticking of lubricant may be prevented.

The above and further objects and features of the invention will more fully be apparent from the following detailed description with accompanying drawings.

DESCRIPTION OF THE PREFERRED EMBODIMENTS

Figure 1:
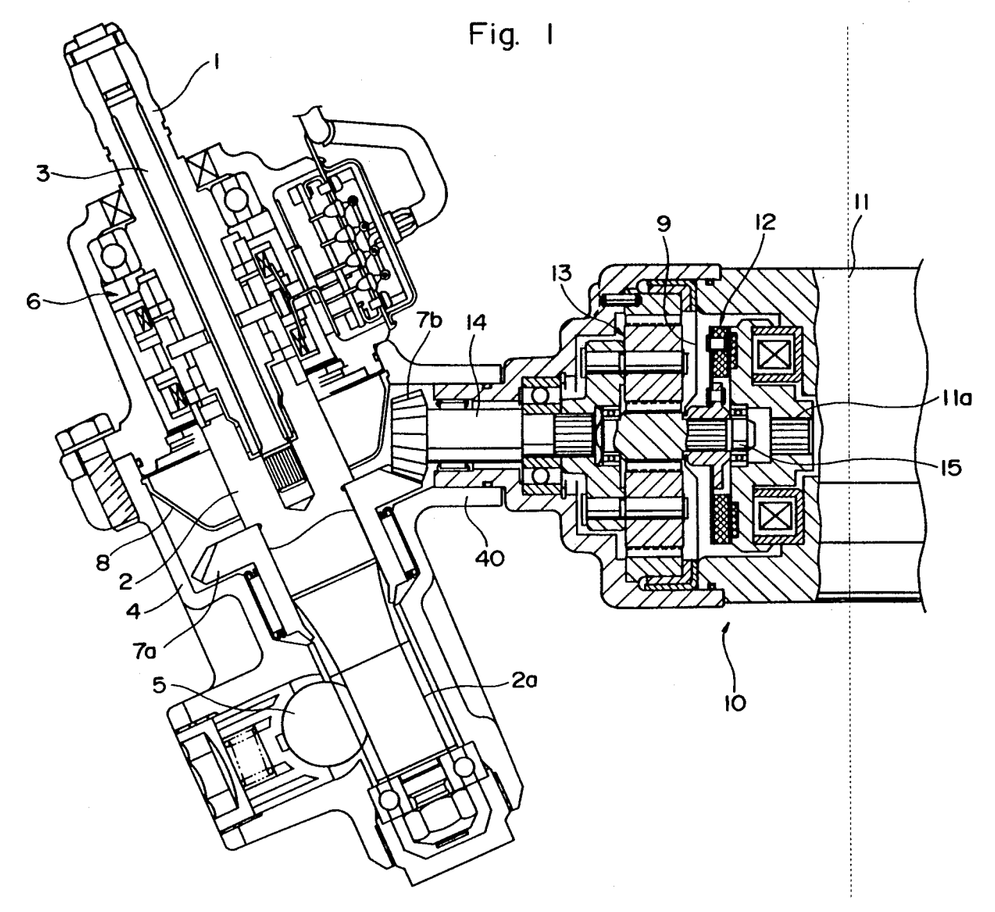
FIG. 1 is a vertical sectional view of the main part of a power steering apparatus of the invention.

In FIG. 1, the reference numerals 1 and 2 indicate an upper shaft and a lower one, respectively. Both shafts 1 and 2 are coaxially connected to each other through a torsion bar 3 and rotatably supported in a common cylindrical housing 4. The upper end of the upper shaft 1 is connected to a steering wheel not shown. A pinion 2a formed on the outer periphery near the lower end of the lower shaft 2 is meshed with a rack shaft 5 intersecting the pinion. In this way, a rack-pinion type steering mechanism is so constructed as to perform steering corresponding to the slide of the rack shaft 5 in the axial direction thereof. When operating torque is exerted on the steering wheel, the upper shaft 1 tends to rotate correspondingly thereto whereas the rotation of the lower shaft 2 is restricted by resistance acting on the steering mechanism, whereby torsion corresponding to the amount and direction of the operating torque is generated in the torsion bar 3 and relative angular displacement corresponding to this torsion develops at the connecting part between the upper and lower shafts 1 and 2. In the drawing, the reference numeral 6 indicates a torque sensor constructed at the connecting part between the upper and lower shafts for detecting operating torque acting on the steering wheel in terms of relative angular displacement.

A large bevel gear 7a is fitted on the middle outer periphery of the lower shaft 2 with toothed face thereof directed upward. In the vicinity of the gear-fitting part, the housing 4 is provided with an outwardly extending cylindrical fixed housing 40. An assisting-power generating part 10 concentrically with an electric motor 11 as a steering assisting power generating source, an electromagnetic clutch 12 for turning on and off the output of the motor 11, and a planet wheel reduction unit 13 for increasing output of the motor 11 is fitted into the open end of the fixed housing 40. A transmission shaft 14 as an output shaft of the assisting-power generating part 10 is provided to extend to the inside of the housing 4 after passing through the fixed housing 40. A small bevel gear 7b fitted on the extended end of the transmission shaft 14 is meshed with the large bevel gear 7a. Output of the motor 11 is taken out to the transmission shaft 14 through the electromagnetic clutch 12 and planet gear reduction unit 13, transmitted to the lower shaft 2 through the small bevel gear 7b and large one 7a, and then converted into sliding in the axial direction of the rack shaft 5 upon meshing of the pinion 2a with the rack shaft 5, thereby steering being performed. The motor 11 is driven on the basis of detection result of steering torque by means of the torque sensor 6 and adapted to generate the force corresponding to steering torque in the direction of steering torque exerted on the steering wheel. Output of the motor 11, as described above, is transmitted to the rack shaft 5 and adds to the force required for operating the steering wheel.

In the housing 4, a thin shallow-cup-like shielding member 8 is mounted as shown in the drawing in such manner as separating the meshing part of the bevel gears 7a and 7b from the torque sensor 6. The shielding member 8 functions to prevent a scatter of lubricant grease filled in the meshing part of the bevel gears 7a and 7b so as to maintain satisfactory lubricating condition thereat and also to intercept ingress of grease into the composing parts of the torque sensor 6 so as to prevent errors in detection of steering torque caused by sticking of grease.

Figure 2:
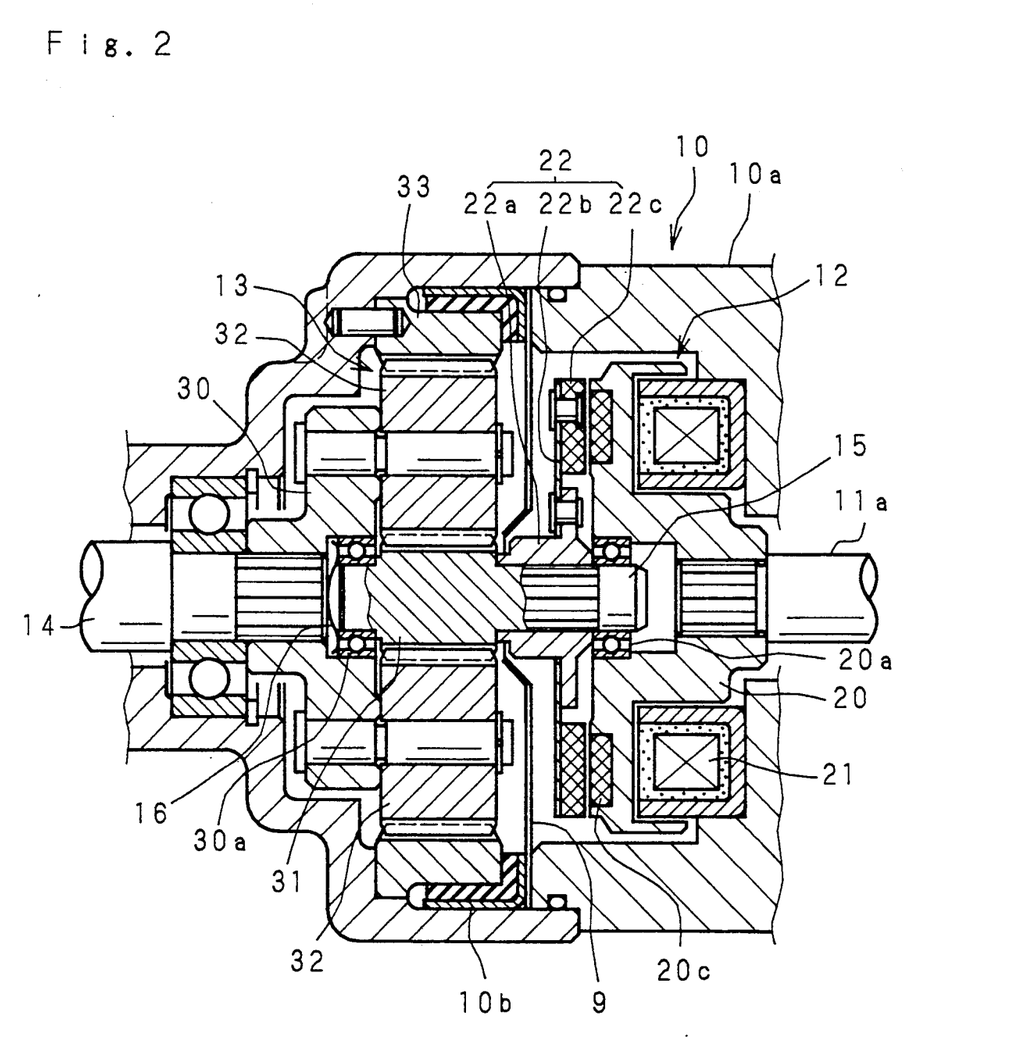
FIG. 2 is an enlarged sectional view of an assisting-power generating part of a first embodiment.

The power steering apparatus of this invention is characterized by an internal structure of the assisting-power generating part 10. FIG. 2 is an enlarged sectional view of the assisting-power generating part 10 of the first embodiment.

In the drawing, the numeral 10a represents a housing enclosing the whole of the assisting-power generating part 10. An output shaft 11a of the steering assisting motor 11 and a transmission shaft 14 connected to the steering mechanism are coaxially supported in such manner that respective ends of both shafts are spaced from each other at a certain fixed distance in the axial direction. A transmission system from the output shaft 11a to the transmission shaft 14 is composed of an electromagnetic clutch 12 provided on the side of the motor 11 (right side on the drawing) and a planet gear reduction unit 13 on the side of the transmission shaft 14 (left side on the drawing).

To the output shaft 11a of the motor 11, a thick disk-like retainer 20 composing a part of the electromagnetic clutch 12 is connected with a spline. To the transmission shaft 14, a thick disk-like carrier 30 composing a part of the planetary gear reduction unit 13 is connected with a spline. The retainer 20 and carrier 30 are each provided with a round hole of a certain fixed depth at positions of axial centers on the sides opposite to each other. A ball bearing 20a is fixedly fitted into the round hole of the retainer 20 and another ball bearing 30a is fitted into the round hole of the carrier 30 slidably in the axial direction. An intermediate transmission shaft 15 featuring this invention is supported by ball bearings 20a, 30a at both ends between the output shaft 11a and transmission shaft 14. In the abovesaid round hole formed on the carrier 30, a wave washer 16 as biasing means is mounted while adapted to be in contact with the end face of the transmission shaft 14 facing the inside of the round hole and with the outer ring of the ball bearing 30a. The intermediate transmission shaft 15 is biased toward the side of the output shaft 11a by the wave washer 16 through the ball bearing 30a.

A sun gear 31 of the planet gear reduction unit 13 is formed on the outer periphery of the intermediate transmission shaft 15 on the side of the transmission shaft 14. An armature part 22 of the electromagnetic clutch 12 is fitted on the outer periphery of the transmission shaft 15 on the side of the output shaft 11a. The armature part 22 is provided with a cylindrical boss 22a fitted onto the intermediate transmission shaft 15, a movable thin plate 22b fixed to the boss 22a at one end and extending outwardly in the radial direction, and a friction plate 22c fixed to the movable plate 22b at the side of the output shaft 11a. The boss 22a is retained by the shoulder face of a part composing the sun gear 31 and the inner ring of the ball bearing 20a at both ends respectively. The boss 22a is pressed to the inner ring surface of the ball bearing 20a by biasing force of the wave washer 16 acting through the part thereof in contact with the shoulder part.

A driving coil 21 is fixedly fitted into the housing 10a at a position approximately agreeing with the tip of the output shaft 11a of the motor 11 in the axial direction. The driving coil 21 is disposed in a recess formed throughout the peripheral surface of the retainer 20 on the side of the motor 11 and spaced from the bottom of the recess with a minute gap therebetween. A friction plate 20c is fixed to the other face of the retainer 20. The friction plate 20c is adapted to agree with the friction plate 22c of the armature part 22 in the radial direction and opposite to the friction plate 22c at a fixed distance in the axial direction.

The electromagnetic clutch 12 comprises a retainer 20 composed as above, a driving coil 21, and an armature part 22. When the driving coil 21 is out of excitation, only the retainer 20 rotates in association with the output shaft 11a. When the driving coil 21 is excited, the friction plate 22c of the armature part 22 and the movable plate 22b are attracted to the side of the retainer 20 by the action of a magnetic field induced in the vicinity of the armature part 22 through the retainer 20 and are brought into slide contact with each other, whereby output of the output shaft 11a is transmitted to the intermediate transmission shaft 15 through the retainer 20 and armature part 22.

The planet gear reduction unit 13 is provided with a sun gear 31 formed on the outer periphery of the intermediate transmission shaft 15, a ring gear 33 fixedly fitted into the housing 10a through a stationary ring 10b internally lined with rubber material and having a toothed face at inner side, and a plurality of planetary gears 32, 32, . . . supported by the carrier 30. The sun gear 31 and ring gear 33 are approximately agreeing with each other in the axial direction. The planetary gears 32, 32, . . . are meshed with the sun gear 31 and ring gear 33 respectively in the annular space formed between these two gears. The planetary gears 32, 32, . . . rotate together with the carrier 30 rotating in association with the transmission shaft 14 and revolve around respective pivotal shafts extending in parallel with the rotating shaft. Accordingly, rotative power transmitted to the intermediate transmission shaft 15 upon engagement with the electromagnetic clutch 12 is transmitted to the planetary gears 32, 32 . . . through the sun gear 31 to the rotating shaft, that is, the transmission shaft 14 while followed by slowdown as fixed, and to the steering mechanism as described above.

The planetary gear reduction unit 13 is fitted with grease to be used for lubrication at the meshing part between the sun gear 31, as well as the ring gear 33, and planetary gears 32, 32 . . . . Scatter of grease upon the side of the electromagnetic clutch 12 and sticking to the slide contact surface of the friction plates 20c, 22c hamper the engaging action of the electromagnetic clutch 12. In the steering apparatus of this invention, a shielding member 9 is provided between the planetary gear reduction unit 13 and the electromagnetic clutch 12. The shielding member 9 shown in FIG. 2 is a thin plate-like member fixedly interposed between one end surface of the stationary ring 10b and the inner shoulder face of the housing 10a. The inner peripheral edge of the shielding member 9 is opposite to the outer periphery of the boss 22a, which is fitted on the intermediate transmission shaft 15, with a slight gap left therebetween.

For exact engagement and disengagement depending on the electromagnetic clutch 12 as described above, it is important that a gap (initial gap) between the friction plates 20c, 22c before entering into slide constant each other is maintained properly throughout the area in the circumferential direction. In the steering apparatus of this invention, the armature part 22 is fitted on the intermediate transmission shaft 15 supported at both ends between the output shaft 11a and transmission shaft 14, and slightly tilts with respect to the retainer 20 fixed to the output shaft 11a, whereby uniformity of the initial gap in the circumferential direction is maintained exceedingly high without requiring intricate adjusting operation at the time of assembling. The intermediate transmission shaft 15 supporting the armature part 22 is biased toward the side of the output shaft 11a by the biasing force of the wave washer 16, and the armature part 22 and friction plate 22c thereof are positioned with respect to the retainer 20 and friction plate 20c fixed thereto while clamped at both ends of boss 22a thereof between the shoulder of the abovesaid sun gearformed part 31 of the intermediate transmission shaft 15 and the inner ring of the ball bearing 20a. Accordingly, the size of the initial gap can easily be made proper by improving the precision in finishing the retainer 20 and armature part 22 without adjusting operation at the time of assembling. That is, in the steering apparatus of this invention, intricate adjusting operation for the initial gap between the friction plates 20a, 22a is needless in assembling the electromagnetic clutch 12, thereby assuring exact engagement and disengagement.

The shielding member 9 is provided between the planetary gear reduction unit 13 and the electromagnetic clutch 12 and, thus, the composing part of the planetary gear reduction unit 13 and that of the electromagnetic clutch 12 are almost completely shielded from each other by the shielding member 9, except a small portion necessary for piercing of the intermediate transmission shaft 15. Therefore, grease in the planetary gear reduction unit 13 is completely prevented from scattering by the shielding member 9 and insufficient engaging action of the electromagnetic clutch 12 caused by scatter of grease is prevented beforehand. The installation of the shielding member 9 mitigates the shortage of grease developing with the lapse of time and scattering in the planetary gear reduction unit 13 and exhibits such additional effect as assuring normal transmission performance of the planetary gear reduction unit 13 for a long term.

Figure 3:
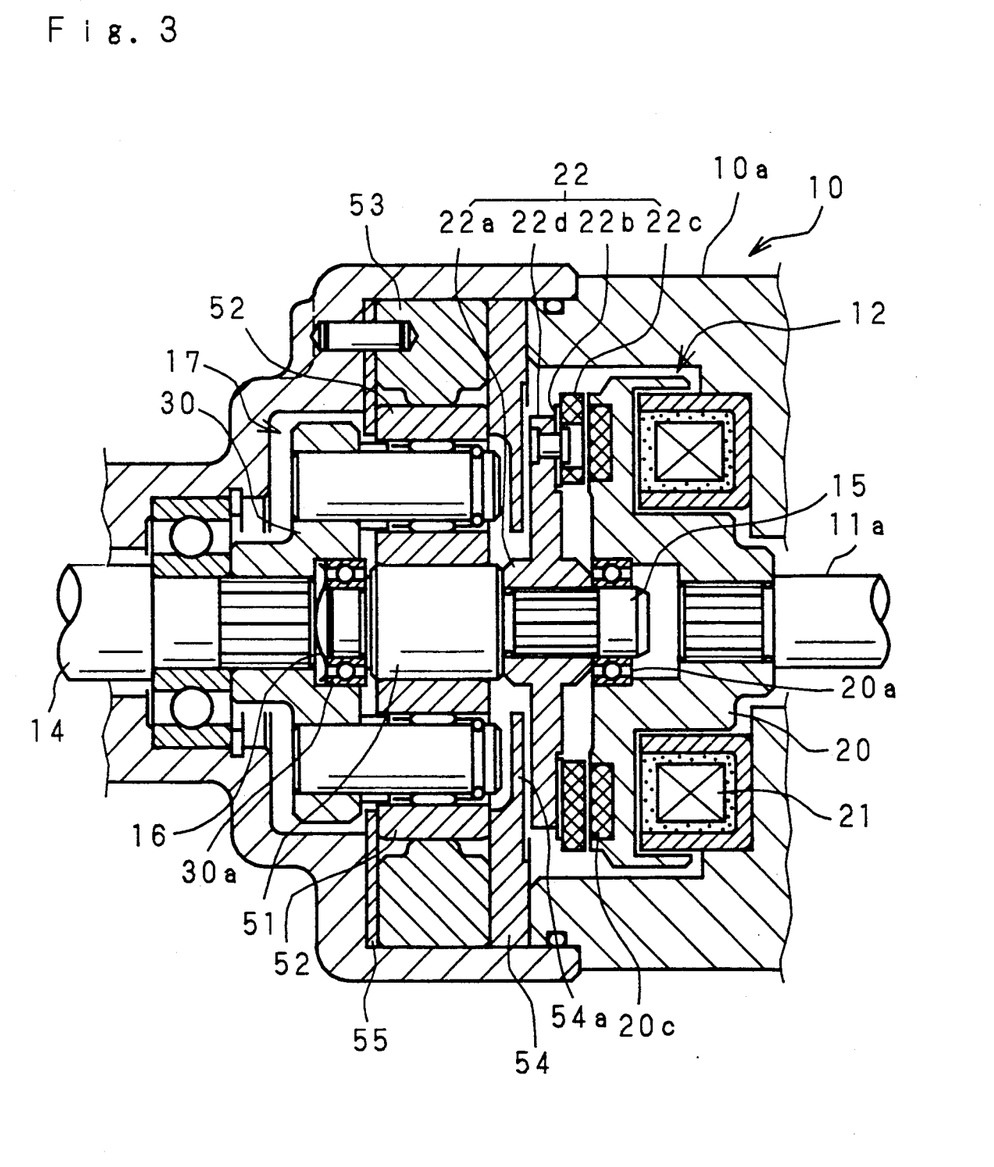
FIG. 3 is an enlarged sectional view of an assisting-power generating part of a second embodiment.

FIG. 3 is an enlarged sectional view of an assisting-power generating part 10 as the second embodiment of this invention.

The assisting-power generating part 10 shown in this drawing is provided with a planetary roller reduction unit 17 in place of the planetary gear reduction unit 13 as in FIG. 2. The planetary roller reduction unit 17 is in such structure that a plurality of planetary rollers 52, 52, . . . are arranged between a sun shaft 51 formed of a diametrally enlarged mid-portion of the intermediate transmission shaft 15 and a stationary ring 53 fixedly fitted into the housing 10a, the planetary rollers being in rolling contact with the sun shaft, and these planetary rollers are rotatably supported by the carrier 30 connected to the end of the transmission shaft 14 with a spline. Output of the motor 11 taken out to the intermediate transmission shaft upon interlock of the electromagnetic clutch 12 is transmitted to the planetary rollers 52, 52, . . . through the sun shaft 51 formed on the midway of the transmission shaft 15, and is further transmitted to a shaft around which these rollers revolves, that is, the transmission shaft 14 while followed by slow-down of speed. The stationary ring 53 is fixed in the housing 10a while clamped at both ends by annular disk-like spacer plates 54, 55. Respective inner peripheries of the spacer plates 54, 55 extend innerly more than the inner periphery of the stationary ring 53. The spacer plates 54, 55 restrict the axial displacement of the planetary rollers 52, 52, . . . and act to keep the radial directional agreement between the planetary rollers 52, 52, . . . and the stationary ring 53.

Among these spacer plates 54, 55, the one 54 positioned on the side of the electromagnetic clutch 12 extends to the vicinity of the outer periphery of the boss 22a of the armature part 22 and the extended part 54a is utilized as a shielding member for shielding the electromagnetic clutch 12 from the planetary roller reduction unit 17. In the housing 10a of the assisting-power generating part 10, the components of the planetary roller reduction unit 17 and those of the electromagnetic clutch 12 are shielded by the spacer plate 54 functioning also as a shielding member, except a small portion required for piercing of the intermediate transmission shaft 15, concretely, piercing of the boss 22. Accordingly, scatter of grease occurring correspondingly to the action of the planetary roller reduction unit 17 is surely prevented by the spacer plate 54, whereby insufficient interlock of the electromagnetic clutch is averted beforehand. The spacer plate 55 positioned on the side of the transmission shaft 14 extends to the vicinity of the carrier 30 and shields the carrier 30 from the planetary rollers 52, 52, . . . except a small space. Hence, leakage of grease from the paths of the planetary rollers 52, 52, . . . to the carrier 30 can be prevented. Shortage of grease in the planetary roller reduction unit 17 developing with the lapse of time is prevented and normal transmission performance of the planetary roller reduction unit 17 is assured for a long term.

The electromagnetic clutch 12 in this embodiment is somewhat different in structure of the armature part 22 from that shown in FIG. 2. The armature part 22 is constructed in such manner that as disk-like retaining plate 22d is fixedly disposed outside the boss 22a fitted on the intermediate transmission shaft 15 so as to extend roughly in parallel with the spacer plate 54, and a thin movable plate 22b is riveted to the surface of the retaining plate 22d on the side of the retainer 20 at a plurality of points in the circumferential direction as well as a friction plate 22c to this movable plate 22b on the side of the retainer 20. When a magnetic field is induced in the area extending from the retainer 20 to the vicinity of the armature part 22 with the driving coil 21 excited through the retainer 20, the friction plate 22c is attracted to the side of the retainer 20 while followed by deflection of the movable plate 22b centering the riveted points and comes into sliding contact with the friction plate 20c, thereby the output shaft 11a being engaged with the intermediate transmission shaft 15. A narrow gap radially outwardly running is formed between the retaining plate 22d and spacer plate 54, and serves to prevent grease from leaking between the inner periphery of the spacer plate 54 and the boss 22a from reaching the slide contact part between the friction plates 20c and 22c.

A modified example of the second embodiment will be described next.

Figure 4:
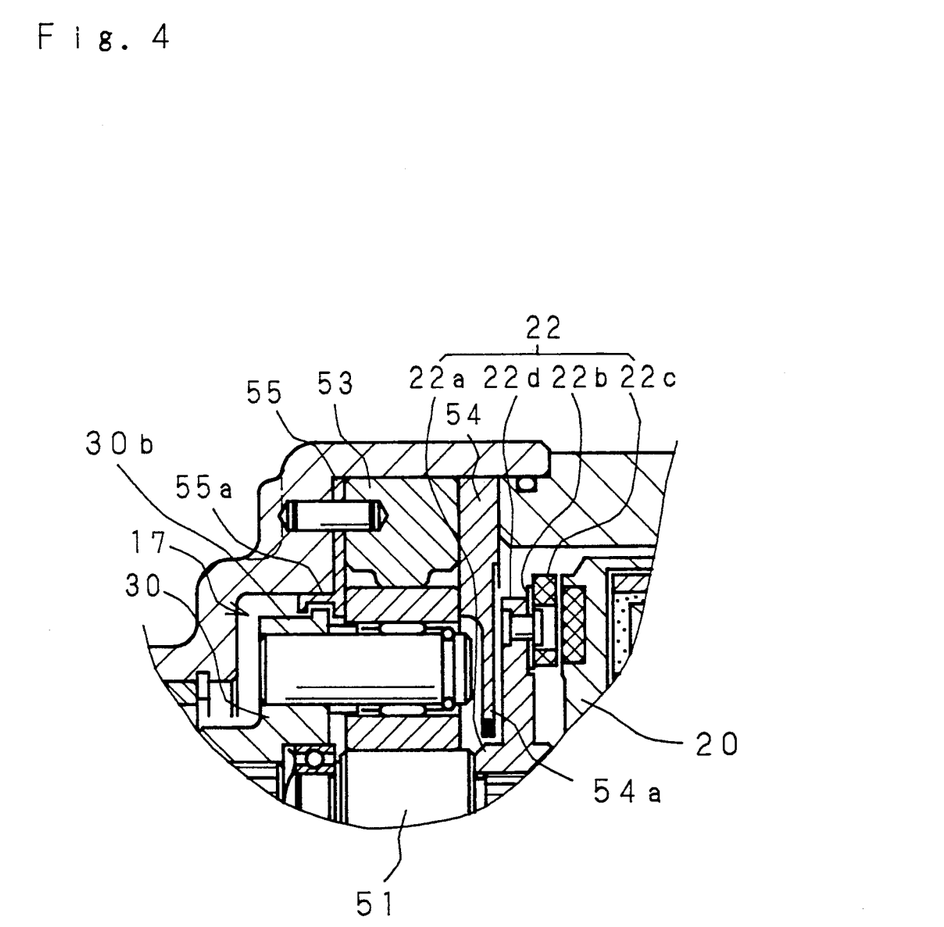
FIG. 4 is a partially enlarged sectional view of a modified example of the assisting-power generating part of the second embodiment.

FIG. 4 is a sectional view of the main part of a modified example of the second embodiment, wherein the same reference numerals are applied to parts corresponding to those in FIG. 3. In this modified example, the extended part 54a of the spacer plate 54 is further extended radially inwardly more than the example shown in FIG. 3 and the further extended part 54a is disposed oppositely to the outer periphery of the boss 22a of the armature part 22 in the radial direction so as to form a labyrinth sealing part. A cross-sectionally roughly L-shaped cylindrical part 55a is formed on the side of the spacer plate 55 integral therewith and a stepped part 30b is formed on the outer peripheral surface of the carrier 30, thereby composing another labyrinth sealing part. These labyrinth sealing parts are bent as shown in the drawing so that the labyrinth path may be made long as far as possible for increasing the sealing effect.

Figure 5:
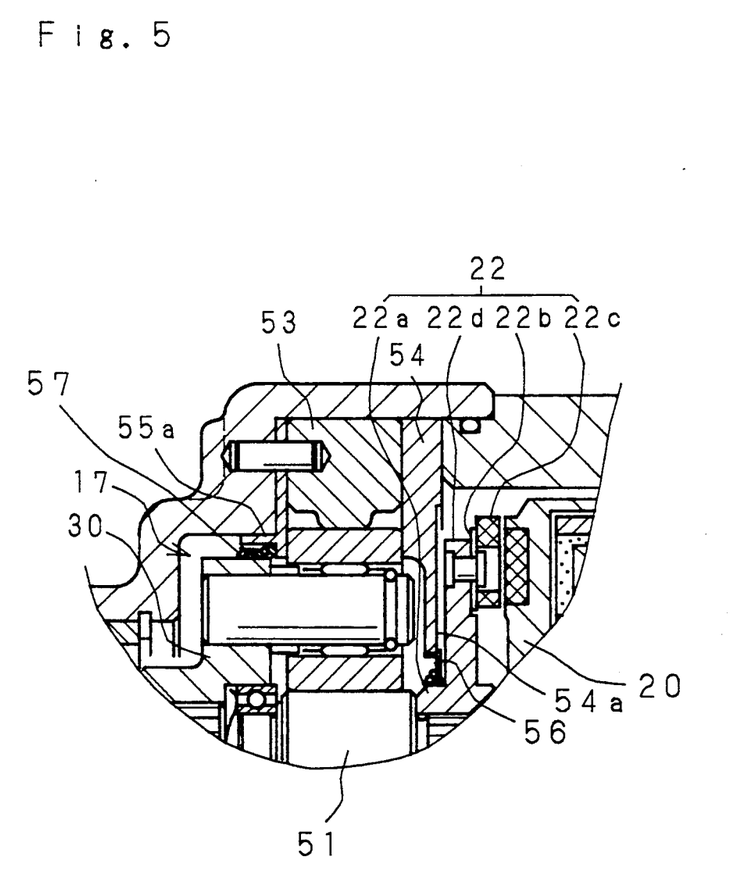
FIG. 5 is a partially enlarged sectional view of another modified example of the assisting-power generating part of the second embodiment.

FIG. 5 is a sectional view of the main part of the other modified example of the second embodiment, wherein the same reference numerals are applied to parts corresponding to those in FIG. 3. In this embodiment, the labyrinth sealing part in the modified example shown in FIG. 4 is replaced by a contact sealing part. The extended part 54a of the spacer plate 54 and the cylindrical part 55a of the spacer plate 55 are used as core metals of the oil seals, and oil sealing lips 56, 57 for oil seals generally used are directly bonded by baking to cover the extended part 54a and cylindrical part 55a. Oil sealing lips 56, 57 are fixedly stuck to the extended part 54a and cylindrical part 55a and adapted to touch the outer peripheral surface of the boss 22a and that of the carrier 30 for composing the contact sealing part. Because of the spacer plates 54, 55 and oil seals formed integrally with each other, operation to fix these parts is simple and no special space for arrangement of the parts is required.

In the embodiments described as above, a structure in which output of the motor 11 for assisting steering is transmitted to the mid-portion of the lower shaft 2 connected to the pinion of the rack-pinion type steering mechanism was explained, however, a different way to transmit output of the motor 11 to the other part in the steering mechanism may satisfy the purpose and this invention is applicable to a steering mechanism of a type other than the rack-pinion one.

Biasing means for the intermediate transmission shaft 15 is not limited to the wave washer 16 employed in the embodiments and, as a matter of course, may be a coiled spring, spring washer, and others.

As detailedly described above, in the power steering apparatus of this invention, the intermediate transmission shaft supported at both ends is provided between the output shaft of the steering assisting motor and the transmission shaft connected to the steering mechanism, and the armature part of the electromagnetic clutch is supported by this intermediate transmission shaft. Thus, inclination of the armature part can be kept slight and, since the intermediate transmission shaft is pressed to the side of the output shaft by biasing means, the intermediate transmission shaft and armature part supported thereby are correctly positioned with respect to the output shaft, whereby an initial gap roughly uniform in the circumferential direction can easily be provided between the friction plates fixed to the side of the armature part and that of the output shaft and occurrence of troubles in performance resulting from unsatisfactory initial gap can be prevented beforehand. Because of the shielding member disposed between the reduction unit composed on the intermediate transmission shaft and electromagnetic clutch, lubricant in the reduction unit can surely be prevented from entering the composing part of the electromagnetic clutch and there are none of risks as insufficient performance of the electromagnetic clutch caused by sticking of lubricant thereto, whereby sure transmission of steering assisting power from the steering assisting motor to the steering mechanism is possible.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the mete and bounds of the claims, or equivalence of such mete and bounds thereof are therefore intended to be embraced by the claims.

What is claimed is:

1. A power steering apparatus comprising:
   a motor disposed in a steering mechanism, and generating a steering assisting power;
   an electromagnetic clutch provided between an output shaft of said motor and a transmission shaft of said steering mechanism, and connecting and disconnecting said output shaft to and from said transmission shaft depending on the action of an armature part thereof;
   an intermediate transmission shaft supported by said output shaft and said transmission shaft, and supporting said armature part; and
   biasing means for urging said intermediate transmission shaft in the axial direction toward a supporting position on the side of said output shaft.

2. A power steering apparatus as set forth in claim 1 further comprising:
   a reduction unit provided between said output shaft and said transmission shaft, for increasing output power of said motor.

3. A power steering apparatus as set forth in claim 2 further comprising:
   a shielding member for shielding said electromagnetic clutch from said reduction unit.

4. A power steering apparatus as set forth in claim 3, wherein said reduction unit is a planetary gear reduction unit.

5. A power steering apparatus as set forth in claim 4, wherein said intermediate transmission shaft is a sun gear of said planetary gear reduction unit.

6. A power steering apparatus as set forth in claim 3, wherein said reduction unit is a planetary roller reduction unit.

7. A power steering apparatus as set forth in claim 6, wherein said intermediate transmission shaft is a sun roller of said planetary roller reduction unit.

8. A power steering apparatus as set forth in claim 1, wherein said biasing means is a wave washer.

9. A power steering apparatus comprising:
   a motor disposed in a steering mechanism, and generating a steering assisting power;
   an electromagnetic clutch provided between an output shaft of said motor and a transmission shaft of said steering mechanism, and connecting and disconnecting said output shaft to and from said transmission shaft depending on the action of an armature part thereof;
   an intermediate transmission shaft supported by said output shaft and said transmission shaft, and supporting said armature part;
   biasing means for biasing said intermediate transmission shaft in the axial direction toward a supporting position on the side of said output shaft;
   a planetary roller reduction unit provided between said output shaft and said transmission shaft, for increasing output power of said motor, the reduction unit including:
   a sun shaft formed of a diametrically enlarged midportion of said intermediate transmission shaft; a stationary ring clamped at both sides by two spacer plates; a plurality of planetary rollers in rolling contact with said sun shaft and said stationary ring; and a carrier connected to said transmission shaft with a spline; and wherein said armature part is provided with:
   a boss fitted on said intermediate transmission shaft.

10. A power steering apparatus as set forth in claim 9, wherein one of said two spacer plates which is on the side of said output shaft is extended to the vicinity of said boss and the extended part thereof composes said shielding member.

11. A power steering apparatus as set forth in claim 10, wherein a labyrinth sealing part is formed between said extended part of said one of said two spacer plates and said boss.

12. A power steering apparatus as set forth in claim 10, further comprising:
   an oil sealing lip fixed to said extended part.

13. A power steering apparatus as set forth in claim 12, wherein said oil sealing lip is in contact with the outer periphery of said boss so as to form a contact-seal part.

14. A power steering apparatus as set forth in claim 9, wherein one of said two spacer plates which is on the side of said transmission shaft is extended to the vicinity of said carrier.

15. A power steering apparatus comprising:
   a motor disposed in a steering mechanism and generating a steering assisting power;
   an electromagnetic clutch provided between an output shaft of said motor and a transmission shaft of said steering mechanism, and connecting and disconnecting said output shaft to and from said transmission shaft depending on the action of an armature part thereof;
   an intermediate transmission shaft supported by said output shaft and said transmission shaft, said intermediate transmission shaft supporting said armature part and being movable in the axial direction; and biasing means for urging said intermediate transmission shaft in the axial direction toward a supporting position on the side of said output shaft.

16. The apparatus according to claim 15 wherein said output shaft, said intermediate transmission shaft, and said transmission shaft are coaxially arranged so that said intermediate transmission shaft is disposed between said output shaft and said transmission shaft.

17. The apparatus according to claim 15 wherein said output shaft has an elongated shape, wherein said transmission shaft has an elongated shape, wherein said intermediate shaft has an elongated shape, and wherein said output shaft, said intermediate transmission shaft, and said transmission shaft are coaxially arranged so that said intermediate transmission shaft is disposed between said output shaft and said transmission shaft.

18. The apparatus according to claim 17 wherein said biasing means is disposed between said transmission shaft and said intermediate transmission shaft for urging said intermediate transmission shaft toward said output shaft.

19. The apparatus according to claim 18 further comprising:
a carrier mounted to said transmission shaft;
a retainer mounted to said output shaft; and
wherein said intermediate transmission shaft is supported by said carrier and said retainer.

20. A power steering apparatus comprising:
a motor disposed in a steering mechanism and generating a steering assisting power;
an electromagnetic clutch provided between an output shaft of said motor and a transmission shaft of said steering mechanism, and connecting and disconnecting said output shaft to and from said transmission shaft depending on the action of an armature part thereof;
an intermediate transmission shaft supported by said output shaft and said transmission shaft, said intermediate transmission shaft supporting said armature part and being movable in the axial direction; and
biasing means, disposed between said transmission shaft and said intermediate transmission shaft, for urging said intermediate transmission shaft in the axial direction toward said output shaft.

* * * * *